March 23, 1965 R. J. SHEPPARD ETAL 3,174,217
QUICK LAYING PIPE LINE MACHINE
Filed Dec. 11, 1961 5 Sheets-Sheet 1

ROLAND J. SHEPPARD
KENITH C. LOFTIN
INVENTORS
BY Kimmel & Crowell
ATTORNEYS.

March 23, 1965  R. J. SHEPPARD ETAL  3,174,217
QUICK LAYING PIPE LINE MACHINE
Filed Dec. 11, 1961  5 Sheets-Sheet 2

ROLAND J. SHEPPARD
KENITH C. LOFTIN
INVENTORS
BY Kenneth Crowell
ATTORNEYS.

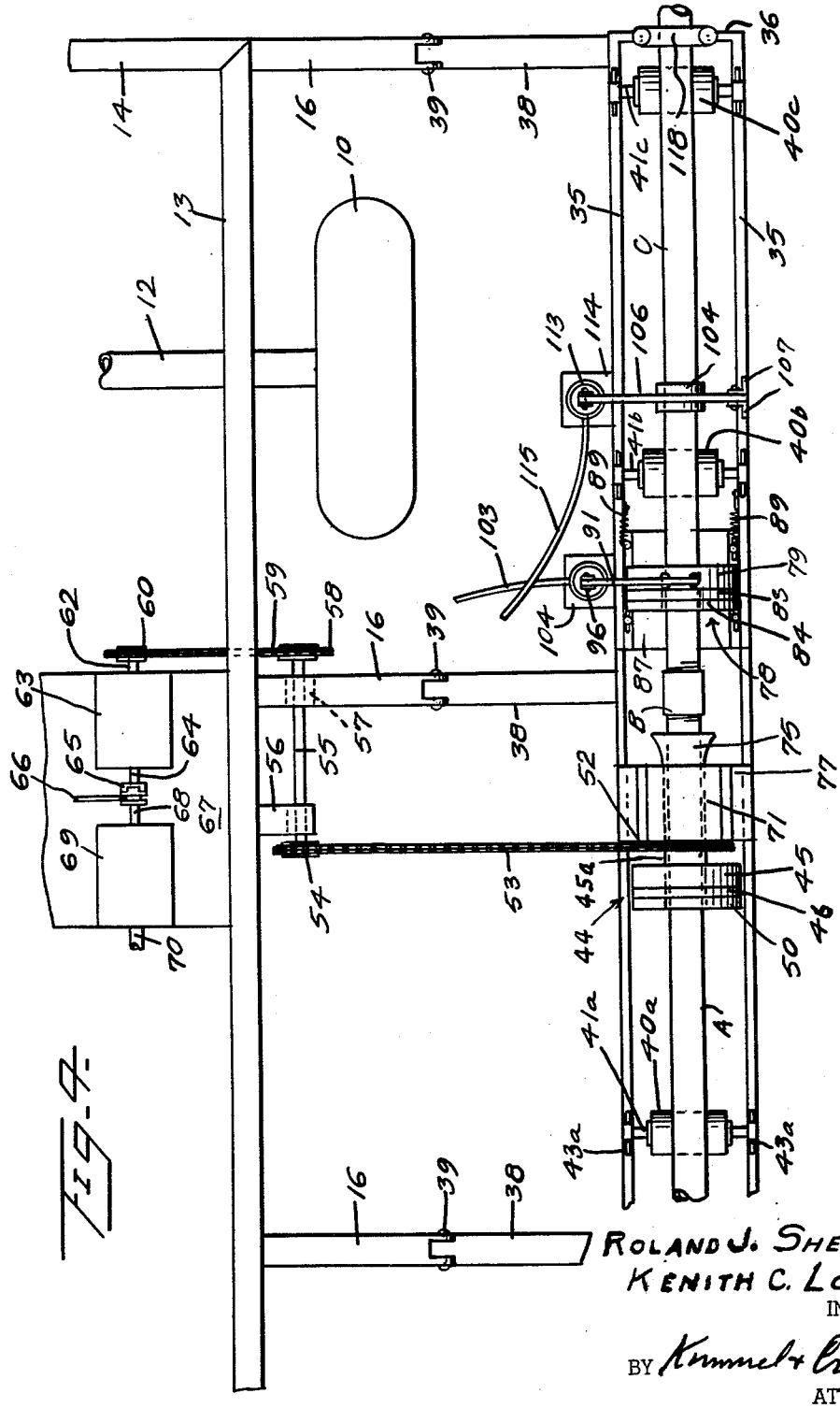

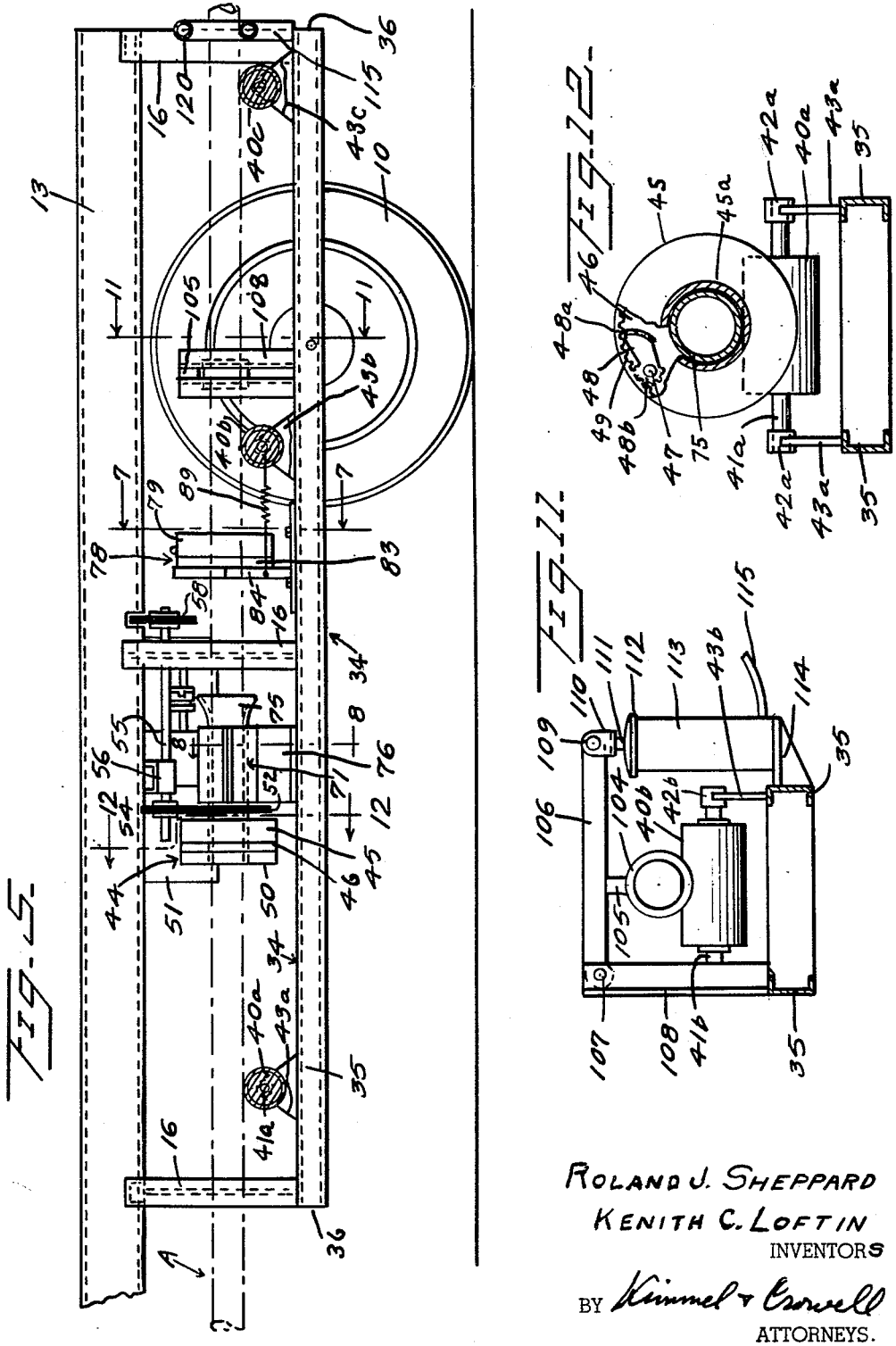

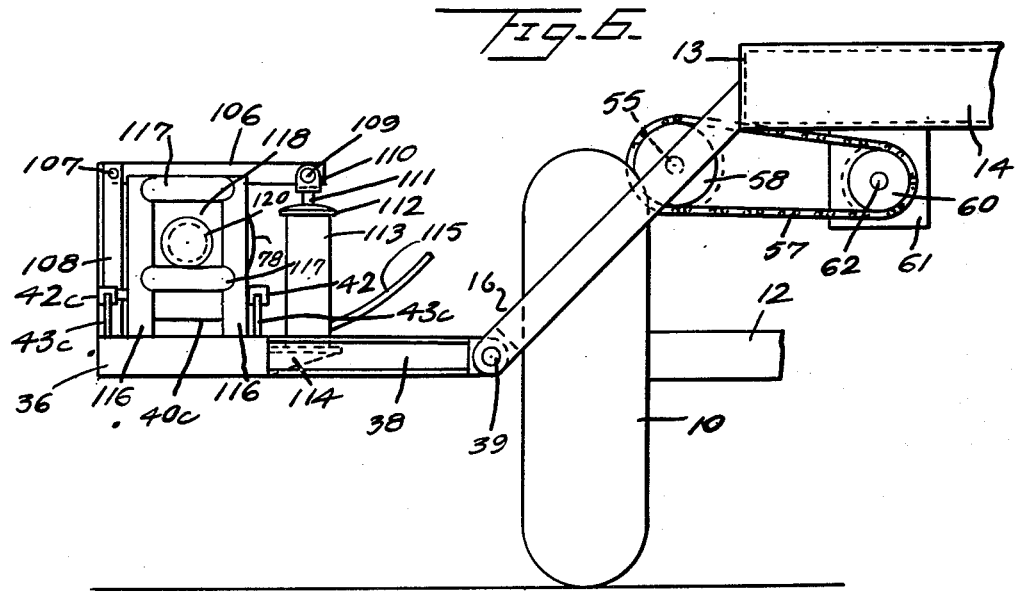

United States Patent Office 3,174,217
Patented Mar. 23, 1965

3,174,217
QUICK LAYING PIPE LINE MACHINE
Roland J. Sheppard, 526 S. Bernice, and Kenith C. Loftin, 203 S. Barkley, both of Spearman, Tex.
Filed Dec. 11, 1961, Ser. No. 158,340
13 Claims. (Cl. 29—240)

This invention relates to a machine for the rapid laying of pipe lines.

It is well known that at the present time pipe lines are frequently laid adjacent highways. The pipe lengths are unloaded from a truck and dropped along a highway. Three men are required for the operation, one for driving the truck and two for unloading the pipe lengths. Then, for carrying the pipe lengths to the location of the line, four men, two with tongs at each of a length of pipe, are required.

For connecting a length of pipe to another length of the line already laid, only two men are required, except in the case of pipe of large diameters. The other two men stand by idle while the length of pipe recently carried into place is connected onto the line. Then too, still other problems arise when a pipe line is to be laid across a rough country at some distance from a highway.

The object of the present invention is to provide a pipe laying machine, which is adapted to travel along a highway, but which can also travel through and perform the pipe laying operation in rough country.

Another object of the present invention is to provide a pipe laying machine which has adequate storage space for a large number of lengths of pipe and can thus be used for both hauling the pipe lengths from the place of supply to the site of the pipe line and connecting the pipe lengths to the line.

A further object of the present invention is to provide a pipe laying machine which can be operated by two men.

Still other objects, advantages and improvements will become apparent from the following specification, taken in connection with the accompanying drawings, in which:

FIGURE 4 is a top plan view of the pipe make-up assembly according to FIGURE 3.

FIGURE 5 is a side elevational view of the rear of the vehicle and the pipe make-up assembly, similar to FIGURE 3, but on a larger scale and with certain parts shown in section.

FIGURE 6 is a transverse view showing the air cylinder which actuates a removable guide for clamping the pipe.

FIGURE 7 is a transverse sectional view, taken on the section line 7—7 of FIGURE 5 and looking in the direction of the arrows, and showing in detail the back-up tongs.

FIGURE 8 is a transverse sectional view, taken on the section line 8—8 of FIGURE 5 and looking in the direction of the arrows, and showing the spindle beyond the tubing tongs, through which the length of pipe being connected onto the line passes.

FIGURE 9 is a longitudinal detail sectional view, taken on the section line 9—9 of FIGURE 1 and looking in the direction of the arrows, showing the pivoted mounting for the first operator's platform.

FIGURE 10 is a transverse detail sectional view, taken on the section line 10—10 of FIGURE 1 and looking in the direction of the arrows, and also showing the support for the first operator's platform.

FIGURE 11 is a transverse sectional view, taken on the section line 11—11 of FIGURE 5 and looking in the direction of the arrows, and showing the first air cylinder for operating the movable pipe guide.

FIGURE 12 is a transverse sectional view, taken on the section line 12—12 of FIGURE 5 and looking in the direction of the arrows, showing the make-up tongs for rotating the length of pipe being connected onto the pipe line.

Figure 1:
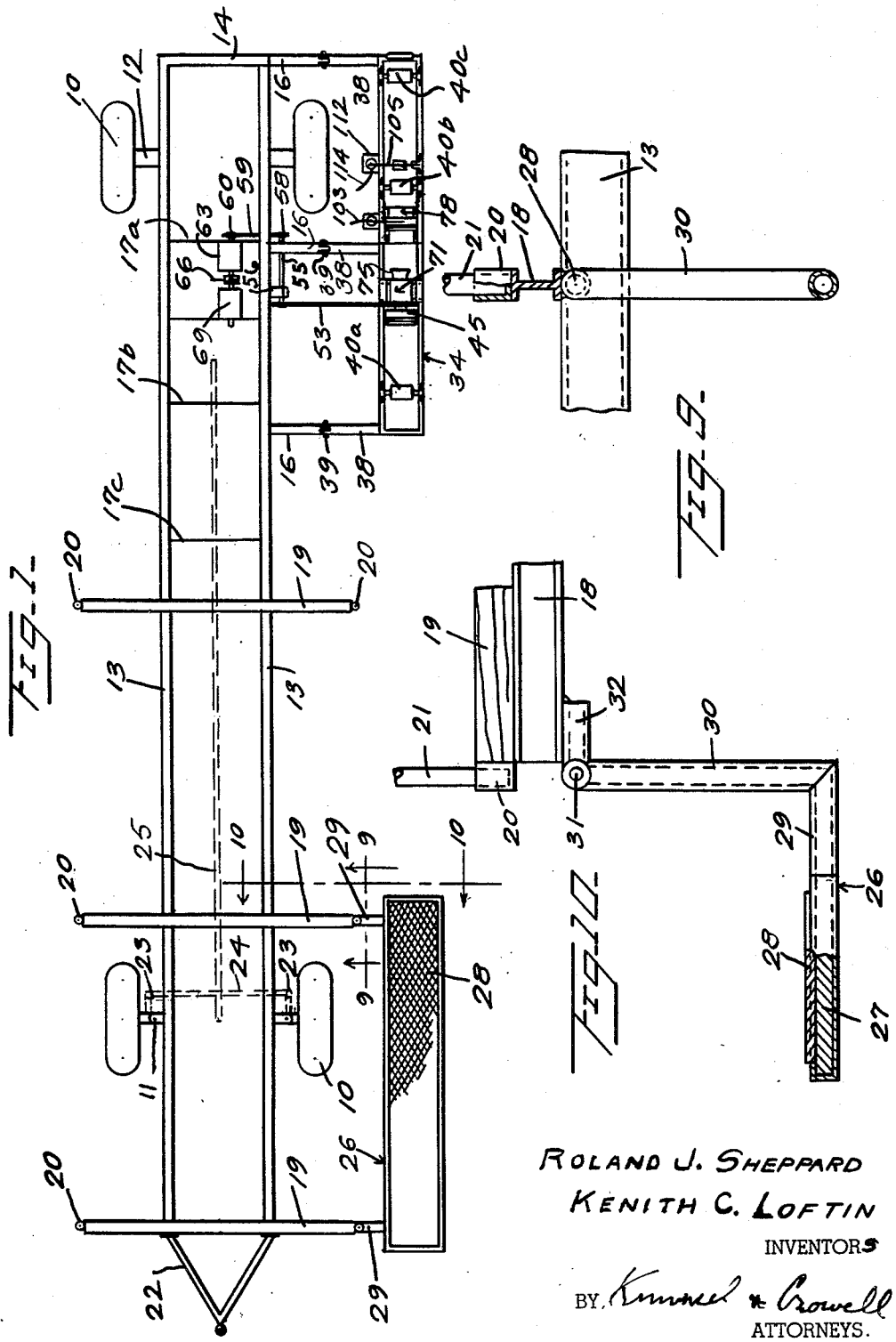
FIGURE 1 is a top plan view of the pipe laying machine according to the present invention.
Figure 2:
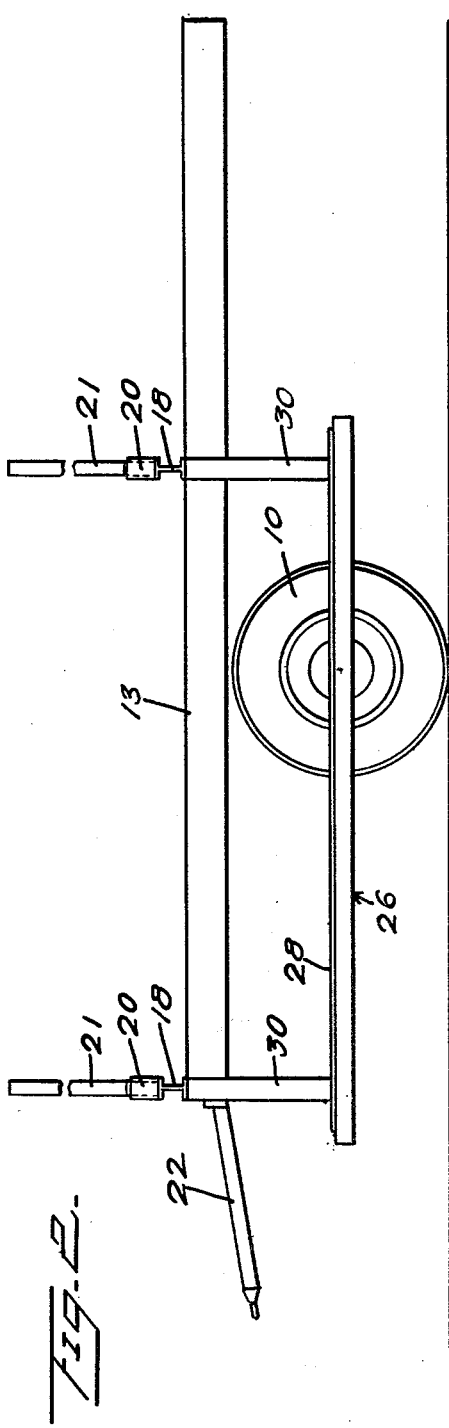
FIGURE 2 is a side elevational view of the vehicle which provides the pipe storage area.
Figure 3:
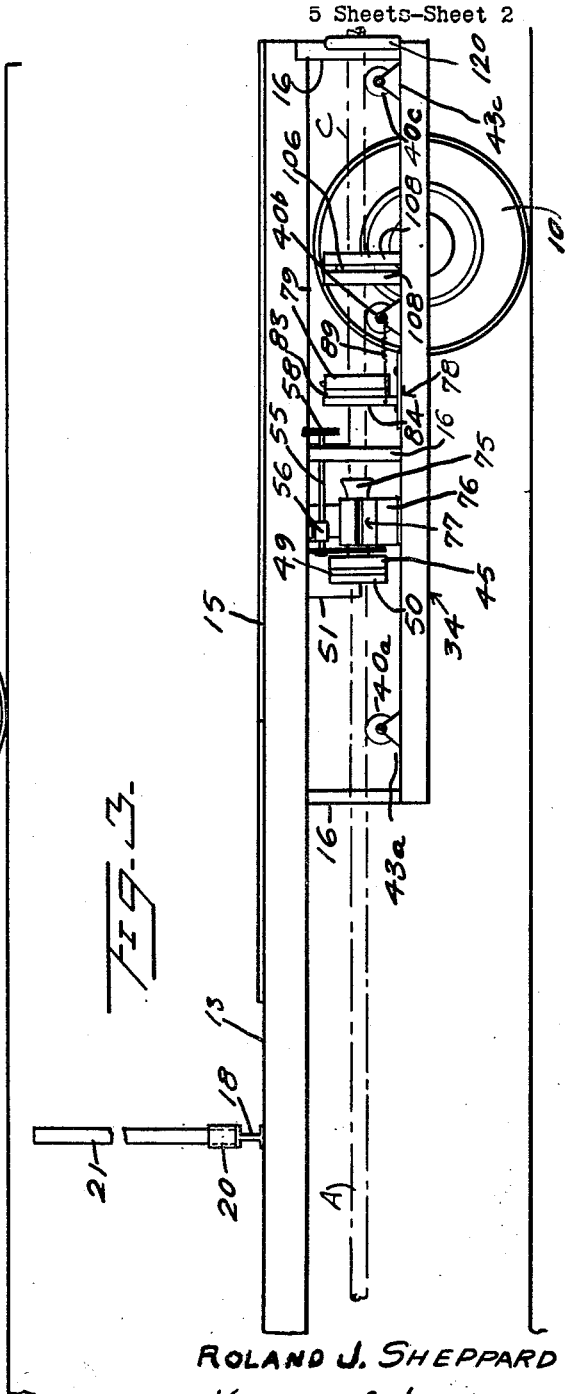
FIGURE 3 is a side elevational view of the rear of the vehicle which mounts the pipe make-up assembly.

Referring now to the drawings in detail, and to FIGURE 1 in particular, the pipe laying machine is here shown as mounted on a four wheeled vehicle. This vehicle is self-propelled, four wheel drive, and steers from either end principally by front and rear wheels 10, a front axle 11, and a rear axle 12, longitudinally positioned frame members 13—13, a rear transverse frame member 14 and three (3) other transversely positioned frame members 18. The rear transverse frame member 14 and the longitudinally positioned frame member 13—13 are covered by a top plate or planking 15 (FIG. 3) for approximately half of the length of the vehicle bed. From the rear of the vehicle body the latter is divided by suitable partition members 17a, 17b and 17c, into a truck bed area, a cab area and an engine area, respectively. The three (3) transversely positioned frame members 18 are I beams and one is located just beyond the partition 17c, the third forms the front end of the vehicle body, and the second is located midway between the other two, thus dividing the vehicle bed into forward and rear pipe storage areas. It is contemplated that these two pipe storage areas, when fully loaded, will carry about one hundred lengths of pipe. These transverse frame members 18 extend on the opposite sides of the vehicle body for a total width that is approximately the maximum allowed by the motor vehicle regulations for motor vehicles travelling on the public highways, about seven and a half (7½) feet. Beams 19 are positioned on the tops of the transverse frame members 18 and extend slightly beyond the outer ends of same, these beams forming supports for the lengths of pipe in the pipe storage areas. At their outer ends these beams 19 have mounted thereon hasps 20, in which are positioned standards 21. These standards 21 support the lengths of pipe in the storage areas on their sides.

A suitable hitch 22 is provided on the forward transverse frame member 18 for towing the trailer from a vehicle, when desired.

A steering linkage is provided for the trailer including radius arms 23—23 on the front wheels 10—10, a drag link 24 connected at its opposite ends to the radius arms, and an operating link 25 connected to the drag link and which latter extends to a steering column (not shown) in the cab area of the tractor, between the partitions 17a and 17b. Similar radius arms 23—23 and a similar drag line 24 are provided for the rear wheels 10—10, but are not illustrated.

On the left side of the vehicle and forwardly thereof, there is provided a pivotally mounted platform, generally designated by the reference numeral 26, on which one of the operators stands, so as to be in a position to remove lengths of pipe from the forward pipe storage area and feed same into the pipe make-up assembly, to be later described. It will be understood that, when all of the lengths of pipe have been removed from the forward pipe storage area, the lengths of pipe in the rear pipe storage area will be shifted into the latter. This platform 26 is pivotally mounted so that it can be folded over the top of the forward pipe storage area of the trailer, when the latter is travelling along the highway, so as to keep within the width limit for vehicles travelling along the highways, as provided by the motor vehicle regulations. The platform is comprised by a plank 27, having on its top a suitable reticulated metal tread 28. For supporting the platform 26 hangers 30 are provided, these hangers having lower right angled ends 29, which carry the plank 27, and at their upper ends are joined by hinges 31 to horizontal bars 32, which latter are secured, as by welding, to the under sides of the forward and middle transverse frame members 18—18.

The pipe make-up assembly is also mounted on a pivotally supported platform, which is positioned on the left side and at the rear of the body frame, and which is designated generally by the reference number 34. This platform is comprised by a pair of longitudinally extending channel members 35—35, which are faced with their flanged sides inwardly, and transversely positioned end channel members 36. A pivoted mounting is likewise provided for the platform 34 and this pivoted mounting is comprised by horizontally positioned arms 38—38, which are secured by pivot pins 39 to downwardly and outwardly extending arms 16—16 on the left longitudinal frame member 13 of the trailer. As with the platform 26, the pivotal mounting of this platform 34 is provided so that the platform can be folded over onto the body of the truck, when the pipe laying machine is travelling along a highway, and thus keep within the width limits for vehicles travelling along the highways, as provided by the motor vehicle regulations.

The lengths of pipe are fed into the pipe make-up assembly by the first operator, standing on the platform 26, over a first rubber-covered roller 40a. This latter is mounted for rotation on a shaft 41a, which is supported by bosses 42a—42a, on parallel ears 43a—43a, secured to the top flanges of the longitudinally extending channel members 35—35 of the platform 34.

The leading length of pipe A passing over the roller 40a is next received in a make-up tongs, which is shown in detail in FIGURE 12 and generally designated by the reference numeral 44. This make-up tongs is comprised in part by a rotatably mounted drum 45 having a chain sprocket 52, a hollow bearing boss 45a thereon, by which it is rotatably mounted on a sleeve 75, to be later described, and a chain sprocket 52 on the boss 45a. In alignment with this drum 45 there is mounted a first circular plate 46, which has stub shafts 47 at spaced intervals around and adjacent its periphery. Dogs 48 are pivotally mounted on the stub shafts 47 and have inner arcuate ends 48a which are adapted to grip the length of pipe A being connected onto the line, and at their outer ends are formed with sector gears 48b. These sector gears mesh with an internal ring gear 49, which is formed on the inner wall of the drum 45. The circular plate 46 is rotatably mounted on a second fixed circular plate 50, which is in turn secured to a third plate 51, the latter being supported on the left longitudinally extending frame member 13 of the vehicle body. As shown in FIGURE 12, the drum 45 may be rotated in the clockwise direction to cause the arcuate ends 48a of the dogs to move radially inwardly into engagement with the length of pipe A. The ring gear 49 moves the dogs 48 inwardly in uniformity, exerts even pressure at spaced areas around the circumference of the pipe length A and centers the latter with respect to the circular plate 46. Conversely, rotation of the drum 45 in the counter clockwise direction will cause the ring gear 49 to move the arcuate ends 48a of the dogs radially outwardly from engagement with the length of pipe A. This rotation of the drum 45 in opposite directions is accomplished by a chain drive, including the chain sprocket 52, to be later described. It is here noted that the dogs are removably mounted on the stub shafts 47 and may be taken off, turned through 180°, and replaced. This would be done for breaking out the pipe, that is when the machine is used for removing lengths of pipe A in taking up a pipe line.

The chain sprocket 52 is driven by a chain 53 from a chain pinion 54, which is mounted on one end of a jack shaft 55, the latter being journalled in a bearing bracket 56, supported on the left longitudinally extending frame member 13, and also in a bearing 57 on the middle arm 16 on the latter longitudinally extending frame member. At its other end the jack shaft carries a chain gear 58. A chain 59 is trained over the chain gear 58 and also over a chain gear 60 on the driven shaft 62 of a three (3) speed gear box 63. The shaft 62 is journalled in a bearing bracket 61, which is mounted on a bed plate 67, to be later described. The three (3) speed gear box 63 includes a shift control (not shown). The mounting for the three (3) speed gear box is comprised by a bed plate 67, over the planking 15, which latter is laid across the longitudinally extending frame members 13—13 of the trailer body. A power take-off 69 is also mounted on the bed plate 67. The driven shaft 70 of the power take-off 69 is connected to an engine (not shown) in the engine area between the partitions 17b and 17c of the trailer body. A clutch 65, which is operated by a lever 66, is connected between the driving shaft 68 of the power take-off 69 and the driven shaft 64 of the three (3) speed gear box.

The three (3) speed gear box 63 provides for different diameters of pipe and varying coarseness of pipe threads. As noted above, the power take-off 69 rotates the drum 45 of the make-up tongs 44 in either direction. There are therefore three speeds in both directions.

The length of pipe A to be connected onto the line next passes through a spindle, shown in detail in FIGURE 8 and which is designated generally by the reference numeral 71. This spindle is comprised by upper and lower complementary halves 72 and 73, respectively, having complementary flanges 72a—72a and 73a—73a, along their horizontal diameters, the flanges 72a and 73a being pivotally interconnected. A bronze bushing 75 is fitted within the bore through the complementary halves 72 and 73 of the spindle, which form a clamp for same, and the spindle is flared at its exist end. The lower half 73 of this spindle is supported by a vertically positioned plate 76, to which it is secured, as by welding, and which in turn is mounted on a horizontal plate 77, to which the plate 76 is secured, also by welding, and the latter is in turn mounted on the longitudinally extending channel members 35—35 of the platform 34.

The trailing length of pipe C most recently connected onto the pipe line is held by a back-up tongs, which is shown in detail in FIGURE 7 and is designated generally by the reference numeral 78, and is similar to the make up tubing tongs 44 shown in FIGURE 12. The back up tongs of FIGURES 4, 5, and 7 is comprised in part by a drum 79. Within this drum 79 there is rotatably mounted a circular plate 80, which has stub shafts 81 adjacent and around its periphery. Dogs 82 are pivotally mounted on these stub shafts 81 and have arcuate inner ends 82a adapted to grip the pipe length C, and at their other ends are formed with sector gears 82b. These sector gears 82b mesh with an internal ring gear 83, which is secured within the drum 79. This drum 79 is supported by legs 85—85, which are secured thereto, as by welding, and have outturned bottom flanges 85a—85a which rest on a third plate 87 and are secured to the latter by bolts 86.

This plate 87 is slidably mounted on the longitudinally extending channel members 35—35, and is constrained between the top flanges of the latter and metal strips 88—88 which latter are positioned above and in parallel relationship to the top flanges.

The length of pipe C most recently connected onto the line is supported by a rubber covered middle roller 40b, parallel ears 43b—43b on the longitudinally extending similar to the first roller 40a, and similarly mounted by channel members 35—35 of the platform 34. Tension springs 89—89 are connected at one end on the opposite sides of the disc 84 and at their other ends to the shaft 41b of the middle roller 40b. These tension springs 89—89 serve to retract the back-up tongs assembly 78, after the operation of connecting the length of pipe A onto the flange or coupling on the last length C already connected to the line has been completed, as will be later described.

The circular plate 80 is rotated through a short arc in the clockwise direction (FIGURE 7) to swing the dogs 82 radially inwardly, so that their inner arcuate ends 82a grip the length of pipe A; conversely, the plate 80 is rotated through a short arc in the counterclockwise direction to release the arcuate ends 82a of the dogs from the pipe. Since the back-up tongs do not rotate, except for the limited rotation of the circular plate 80, they may be conveniently operated by an air cylinder 96. This air cylinder has a reciprocable piston (not shown) therein and a piston rod 94 is secured to the piston and slidably received in a suitable hole (not shown) in the top 95 of the cylinder. A bar 90 is tangentially secured at one end to the circular plate 80, as by welding and at its other end is pivotally connected to the upper end of the piston rod 94 by a clevis 93 and a pin 92. The air cylinder 96 also has a bottom 97 with parallel ears 98—98 thereon. An eyebolt 100 is positioned between the ears 98—98 on the bottom 97 of the air cylinder and pivotally connected to the ears by a pin 99. At the lower end of its shank the eyebolt 100 is slidably received in an elongated slot in a bracket 102, which is secured to the right longitudinally extending channel member 33 of the platform 34, and nuts 101 are received on the shank of the eyebolt 100, above the top and below the bottom surface of the bracket 102. The slidable mounting of the shank of the eyebolt 100 in an elongated slot in the bracket 102 provides for the air cylinder 96 to travel longitudinally along the channel members 35—35 of the platform 34 with the drum 79 of the back-up tongs 78. A compressed air line 103 extends from the air cylinder 96 to a two-way air valve (not shown) in the cab area of the vehicle body. The piston within the cylinder 96 is operated on its working stroke by compressed air admitted through the line 103 and is returned to rest position by a coiled compression spring (not shown) positioned within the air cylinder 96 and surrounding the piston rod 94.

At the rear of the platform 34 there is mounted a rubber-covered end roller 40c, similar to the first roller 40a and the middle roller 40b, and likewise mounted between parallel ears 43c—43c on the longitudinally extending channel members 35—35 of the platform.

A movable guide is provided for holding the length of pipe C most recently connected onto the line firmly on the middle roller 40b and the rear roller 40c, while a new length of pipe is being connected onto same, as shown in detail in FIGURE 11. This movable pipe guide is comprised by a ring 104 through which the length of pipe C most recently connected onto the line passes, a short bar 105, positioned in alignment with the vertical diameter of the ring 104, and a lever 106, the bar 105 being secured to the ring 104 and the lever 106, as by welding. At its outer end the lever 106 is pivoted by a pin 107 between the parallel inner flanges of a pair of upright angle bars 108—108, which are secured to the left longitudinally positioned channel bar 35 of the platform 34, also as by welding. A second air cylinder 113 is provided and also has a reciprocable piston (not shown) therein. A piston rod 111 is slidably mounted in the top 112 of the air cylinder and at its top carries a clevis 110, which receives the other end of the lever 106 and to which it is pivotally connected by a pin 109. This air cylinder 113 is mounted at its bottom in any suitable manner on a bracket 114, which is likewise secured to the right longitudinally positioned channel bar 35 of the platform 34, as by welding. An air line 115 extends from this second air cylinder 113 to a second two-way air valve (not shown) in the car area of the vehicle body. As with the air cylinder 96 of the back-up tongs 78, the piston in the air cylinder 113 is operated on its working stroke by compressed air admitted through the line 115 and is returned to rest position by a coiled compression spring (not shown) positioned within the air cylinder 113 and surrounding the piston rod 111.

Also, at the rear of the platform 34, as shown in detail in FIGURE 6, there is mounted a fixed pipe guide. This fixed pipe guide is comprised in part by a pair of parallel uprights 116—116, of metal tubing, which are mounted on the rear transversely positioned channel member 36 of the platform 34 and secured thereto, as by welding. A pair of transversely positioned members 117—117, also of metal tubing, are mounted between the uprights 116—116, and secured thereto, likewise by welding. A plate 118 is mounted between the uprights 116—116 and the transversely positioned members 117—117, and secured thereto, similarly by welding. This plate 118 has a central aperture therein, in which is mounted a toroidal grommet 120. As the newly added lengths of pipe A are connected onto the line C, and as the trailer moves forwardly, the line is payed out over the rear end roller 40c and through the grommet 120.

In operation, the vehicle is self-propelled by the engine (not shown) in the engine area on the body. One operator stands on the platform 26 and removes the lengths of pipe first from the forward pipe storage area, between the forward and middle transversely positioned beams 19—19, and later from the rear pipe storage area, between the middle and rear transversely positioned beams 19—19. A second operator is stationed in the cab area between the partitions 17a and 17b. This second operator steers the trailer through the linkage 25, and also operates the controls for the pipe make-up assembly including the tubing tongs 44, the spindle 71, the back-up tongs 78, and the movable guide 103.

The first operator, standing on the platform 26, feeds the lengths of pipe A into the pipe make-up tongs 44 on the platform 34. The lengths of pipe A enter the pipe make-up tongs over the roller 40a and pass through the tubing tongs 45 and the spindle 71. Each length of pipe A has a collar or a coupling B on the trailing end. After the first length of tubing has passed through the make-up tongs to the location where the collar or coupling B on its trailing end is between the make-up tongs 44 and the back-up tongs 78, that is the position designated by "C" on FIGURE 4, the uniting of another length of pipe to the first length can begin. The next length of pipe is fed into the pipe make-up tongs over the roller 40a and through the tubing tongs 44 and spindle 71, until the leading end is against the collar or coupling B on the preceding length of pipe A. The operator in the cab, through one of the two-way valves (not shown) operates the air cylinder 113 to pull down the lever 106 and clamp the length of pipe C, with the collar or coupling B on its trailing end, onto the middle roller 40b and the end roller 40c and constrain same in its longitudinal movement. The operator in the cab, through the other of the two-way valves (also not shown) also operates the air cylinder 96, which actuates the back-up tongs 78 through the bar 90 to clamp the length of pipe C, with the collar or coupling B on the trailing end, from rotation. The air cylinder 96 rotates the back-up tongues 78 one-quarter turn, that is 90°. The operator in the cab next operates the tubing tongs 44 through the power take-off 69 from the engine (not shown) on the trailer, and through the clutch 68, the three (3) speed gear box 60, chain 59, gear 58, jack shaft 55, gear 54, chain 53, and gear 52. Upon applying torque to the tubing tongs 44, the length of pipe A begins to rotate and the leading end is threaded into the collar or coupling B on the trailing end of the length C. As the threads on the leading end of the length A make up into the coupling or collar B on the trailing end of the length C, the back-up tongs 78 slides forwardly with the plate 87, against the tension of the coil springs 89—89. As stated above, the three (3) speed gear box is equipped with a gear shift control (not shown) for changing from one gear ratio to another to accommodate to different diameters of pipe and adjust to different degrees of coarseness of the pipe threads.

Following completion of the make-up the two (2) pipe lengths A and C, the operator in the cab releases torque from the make-up tongs 44 by operating the clutch lever 66 to disengage the three (3) speed gear box 63 from the power take-off 69. The operator then turns the second two-way valve (not shown) to release the air pressure from the cylinder 98 to open the back-up tongs 78. The operator next turns the first two-way valve (also not shown) to release the air pressure from cylinder 113 and thus terminate the holding force exerted by the ring 104 on the pipe length C against the middle roller 40b and the rear end roller 40c. The vehicle is then driven forwardly and the coupled lengths of pipes A and C travel over the middle roller 40b and the rear end roller 40c, the length A being payed out over the roller 40c and the fixed pipe guide 120. The vehicle is stopped at a location where the collar or coupling on the trailing end of the length C is in the same position as formerly occupied by the collar or coupling B on the length A, that is between the make-up tongs 44 and the back-up tongs 78, as shown on FIGURE 4. The operation herein described is now repeated to connect the next length of pipe to the last length C connected onto the line.

The pivoted supports for the first operator's platform 26 and the platform 34, which latter mounts the rollers 40a, 40b and 40c, the tubing tongs 44, the back-up tongs 78 and the movable pipe guide 104, provide for the two (2) platforms to be folded upon the vehicle body, while the vehicle is travelling along the highway between job sites, without exceeding the width limit for vehicles travelling along the highways, as provided by the motor vehicle limitations.

Having now fully described our invention, what we claim as new and useful and desire to secure by Letters Patent of the United States is:

1. A mobile pipe laying machine with an elongated frame including,
   a pipe storage area at a front end,
   a first pivoted platform on one side of the machine transversely aligned with the pipe storage area,
   the platform being pivotally positionable horizontally and outwardly of the frame during pipe laying operations, and pivotally positionable horizontally in a folded position at least partly vertically aligned with the front end of the frame during travel of the machine,
   a second pivoted platform on the same side of the machine transversely aligned with the rear end of the latter and also aligned longitudinally with the first platform, and also positionable like the first platform in outward and folded positions,
   a plurality of longitudinally aligned rollers on said second platform,
   a first set of tongs positioned adjacent a rear roller for holding a trailing length of pipe against rotation,
   and a second set of tongs positioned between said first set of tongs and another roller for holding and rotating a second and leading length of pipe which may be manually fed from the first platform.

2. The machine of claim 1 wherein
   the first set of tongs are mounted for biased slidable movement away from and toward a rear roller, there being a tension spring between the first tongs and rear roller.

3. The machine of claim 1 wherein
   a hollow spindle slightly flared at its exit end is mounted on the second platform, between the first tongs and adjacent the second set of tongs, for holding a leading length of pipe during rotation.

4. The machine of claim 1 wherein
   the second set of tongs for holding and rotating a leading length of pipe is rotatably powered from an engine mounted on the frame and a connecting mechanical train including a reversible power take off, a clutch, a plural speed gear box with a shift control, and a chain drive unit,
   the first set of tongs for holding the trailing length of pipe is powered by a pneumatic cylinder possessing a piston and a coiled compression spring therewithin, the latter returning the piston to a rest position.

5. A pipe laying machine including an elevated platform upon which is mounted
   at least three horizontally aligned supporting rollers,
   a first set of tongs positioned mostly above and between a first foremost roller and a second roller for supporting a first length of pipe on the second roller and holding the pipe against rotation,
   a fixed pipe guide positioned directly adjacent a third and rearmost roller, said guide positioned mostly above the third roller and aligned with the first tongs,
   and a second set of tongs positioned between the first set of tongs and the first foremost roller, for supporting a second length of pipe on the foremost roller and rotating the latter length of pipe.

6. The structure of claim 5 wherein
   the first set of tongs is mounted for biased slidable movement away from and toward the second roller by a tension spring between the first tongs and second roller.

7. The structure of claim 5 wherein
   a hollow spindle flared at its exit end is mounted on the platform and located between the first set of tongs and the foremost roller.

8. The structure of claim 5 wherein
   the first set of tongs is powered by a single acting spring-return-piston within an air cylinder.

9. A pipe laying machine including an elevated platform upon which is mounted
   at least three horizontally aligned supporting rollers,
   a first set of tongs positioned mostly above and between a first foremost roller and a second roller, for supporting a first length of pipe on the second roller and holding the pipe against rotation,
   a pipe guide also mounted on the platform between the second roller and a rearmost third roller end so constructed and arranged as to be movable vertically into and out of engagement with said first length of pipe,
   and a second set of tong positioned on the platform between the first set of tongs and the first foremost roller for supporting a second length of pipe on the foremost roller and rotating the latter length of pipe.

10. The structure of claim 9 wherein
    said first set of tongs is mounted for biased slidable movement away from and toward the second roller by a tension spring connected between the first tongs and the second roller.

11. The structure of claim 9 wherein a hollow spindle with a flared rear end is located on the platform between the first set of tongs and the first foremost roller.

12. The structure of claim 9 wherein the first set of tongs and the pipe guide are powered by separate air cylinders which have flexible hose air inlets.

13. The structure of claim 9 wherein a fixed pipe guide is located on the platform directly adjacent the rearmost third roller to receive and position the first length of pipe.

References Cited by the Examiner
UNITED STATES PATENTS

| | | | |
|---|---|---|---|
| 1,185,962 | 6/16 | Anderson | 29—240 |
| 2,293,107 | 8/42 | Branham | 29—240 |
| 2,780,376 | 2/57 | Sanders. | |
| 3,035,336 | 5/62 | McConnell | 29—240 |

WILLIAM FELDMAN, *Primary Examiner.*

NEDWIN BERGER, *Examiner.*